United States Patent Office 2,847,420
Patented Aug. 12, 1958

2,847,420

PREPARATION OF DL-AMINO ACIDS AND THEIR N-ACYL DERIVATIVES

John C. Vander Weele and Halbert C. White, Midland, Mich., assignors to The Dow Chemical Company, Midland, Mich., a corporation of Delaware No Drawing. Application July 22, 1953
Serial No. 369,721

12 Claims. (Cl. 260—319)

This invention is concerned with an improved method for making N-acyl dl-amino acids, or the corresponding dl-amino acids themselves, from dialkyl esters of acylamido malonic acid or its C-substituted derivatives. It relates in particular to the preparation of such amino acids as glycine, alanine, leucine, norleucine, valine, norvaline, phenyl glycine, phenyl alanine, tryptophan, and other alpha-amino carboxylic acids and their N-acyl derivatives.

The preparation of dl-tryptophan and of its N-acetyl derivative illustrates the problems to be solved by the present invention.

The principal prior method for making dl-tryptophan from diethyl acetamido-(3-indolylmethyl)malonate has involved three steps, in the first of which the ester is saponified in an alkaline medium to form a salt of acetamido-(3-indolylmethyl)malonic acid (I). This step has been followed by acidification and heating to effect decarboxylation and to produce N-acetyl dl-tryptophan (II). Finally, the acetyl compound has been treated with alkali to form a salt of dl-tryptophan (III) and the amino acid may be obtained by acidification of this salt. The above-noted reactions may be represented as follows:

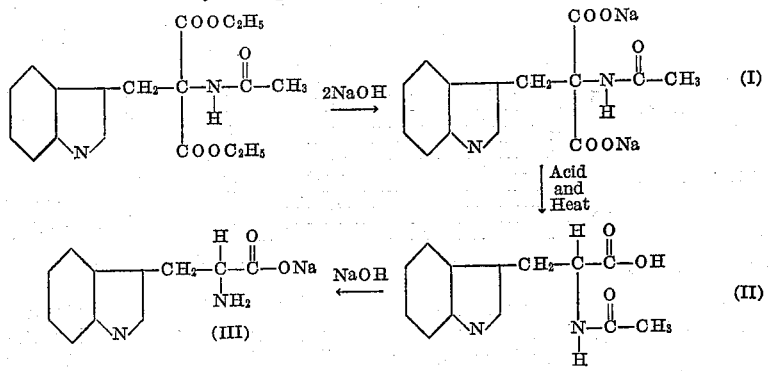

Such a series of reactions, employing such markedly different conditions, has several disadvantages which become apparent when it is attempted to carry out the process on a commercial scale. If a single piece of apparatus is to be used for all the conventional reactions, it must be able to withstand both alkaline and acid conditions. It must also be large enough to hold not only the initial reactants but all of the additional reagents employed and the by-products of the several reactions unless the product from each step is to be withdrawn and purified before the next reaction is carried out. The process and the necessary apparatus have been expensive, and the multistage handling of the intermediate and final products has been wasteful of time, labor and materials.

It is an object of this invention to provide a commercially practical method for making N-acetyl dl-amino acids in a single step from a dialkyl acetamido(C-substituted)malonate, and to provide a method for making dl-amino acids from the acetyl compound without the necessity for isolating the acetyl compound. A related object is to provide such methods which can be carried out in iron apparatus without danger of corroding the apparatus or of contaminating the product. A specific object is to provide a single step method for making dl-amino acids, such as dl-tryptophan, from a dialkyl acetamido-(C-substituted)malonate. Other and related objects may appear hereinafter.

The present invention is based on the discovery that a dialkyl acetamido-(C-substituted)malonate may be saponified and decarboxylated under alkaline conditions, in a single step, to form dl-amino acids or N-acetyl dl-amino acids, and that the latter need not be isolated if it is desired to convert them into the amino acids, as the deacetylation reaction may be caused to take place, with a good overall yield, upon addition of more alkali to the intermediate product, followed by heating, as will be described more fully.

It has been found that the simultaneous saponification and decarboxylation of dialkyl esters of acetamido or other acylamido malonic acid compounds occurs when such ester is heated under pressure with an aqueous solution of from 1.3 to 2.5, and preferably 1.5 to 2.25 equivalent weights of an alkali per mol of the ester, at a temperature from 150° to 300° C., and preferably 150° to 250° C., while the ester and the aqueous alkali are being stirred or shaken together. Soon after saponification is complete, decarboxylation will have occurred, as well, and an excess of alkali may be added if the N-acyl-dl-amino acid is to be converted to the amino acid, or the reaction mixture may be cooled and acidified for recovery of the N-acyl-dl-amino acid. For the former purpose there is added an aqueous solution of 2 to 4 or more equivalent weights of an alkali for each mol of ester originally present, even though one equivalent weight of alkali is theoretically sufficient. This reaction mixture is heated again at a temperature of at least 100° C. If pressure is used, and temperatures near 175° are employed, the reaction is usually complete within 2 hours. The time required varies inversely as the temperature and the excess of alkali present. Finally, the reaction mixture is cooled, neutralized with acid, and the dl-amino acid separates as crystals over the course of several hours. As an alternate procedure, the final conversion of the salt to the free acid may be effected by bringing the solution of the salt into contact with an acid or hydrogen form of a cation exchange resin. In commercial scale operations, the yield of amino acid, based on the initial weight of ester, is from 75 to 85 percent.

It has been found as well that if the initial acylamido ester is heated so that it attains a temperature of 250° to 350° C., and is held at such temperature even for a short time, in the presence of 2.0 to 2.5 or more equivalent weights of alkali per mol of the ester, there can be obtained directly, upon cooling and acidification, a product which is substantially pure dl-amino acid, in good yield. If such reaction temperatures can be attained readily, this single step preparation of amino acids offers considerable advantage.

The new process is represented generically by the following equations:

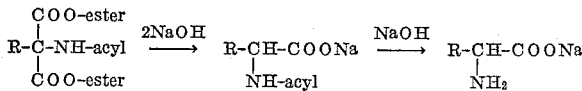

In these formulas, "ester" may be any esterifying group, and is usually a lower alkyl group, such as ethyl; "acyl" represents any of the common acyl or aroyl group such as acetyl, butyryl or benzoyl; and R may be hydrogen or any organic substituent which is substantially inert to alkali under the reaction conditions (or can be regenerated therefrom by acidification) and, under the same conditions, is not reactive with the amino or carboxylic group in the amino acid. Typical values of R include: Hydrogen; alkyl groups containing from 1 to 18 carbon atoms; hydroxyalkyl; mercaptoalkyl; alkoxyalkyl; alkylmercaptoalkyl; aralkyl, such as benzyl or phenethyl; aryl groups of the benzene and naphthalene series, such as phenyl, tolyl, xylyl, ethyl phenyl, isopropyl phenyl, naphthyl; heterocyclic groups, such as thienyl, pyridyl, methyl pyridyl, furyl, pyranyl; and the heterocyclic alkyl groups, such as 3-indolyl methyl, 2-pyridyl ethyl, 4-thienyl methyl, and the like. When R has the suggested values, the resulting amino acids are:

| R | amino acid |
| --- | --- |
| Hydrogen | glycine. |
| Methyl | alanine. |
| n-Propyl | norvaline. |
| Isopropyl | valine. |
| n-Butyl | norleucine. |
| 2-methyl propyl | leucine. |
| n-Octyl | α-amino capric acid. |
| n-Dodecyl | α-amino myristic acid. |
| n-Hexadecyl | α-amino stearic acid. |
| 2-hydroxyethyl | α-amino-γ-hydroxybutyric acid. |
| 2-methoxyethyl | α-amino-γ-methoxybutyric acid. |
| Methyl mercaptoethyl | methionine. |
| Benzyl | phenyl alanine. |
| Phenyl | phenyl glycine. |
| α-Naphthyl | 1-naphthyl glycine. |
| 4-thienyl | 4-thienyl glycine. |
| 3-indolyl methyl | tryptophan. |
| 2-pyridyl ethyl | α-amino-γ-(2-pyridyl) butyric acid. |

The following examples illustrate the practice of the invention:

EXAMPLE 1

In a specific example of the new two-step process, there was charged into an iron pressure vessel 1.0 mol (346 pounds) diethyl acetamido(3-indolylmethyl) malonate
2.2 mols (88 pounds) sodium hydroxide, as 220 U. S. gallons of aqueous solution The mixture was heated and stirred at 175° C. for 90 minutes. It was then cooled nearly to room temperature. The vessel was opened and there was added 112 pounds (2.8 mols) of sodium hydroxide in the form of 67 U. S. gallons of 5 normal aqueous solution. The vessel was closed and heated again to 175° C. for 2 hours, while stirring the contents. The reaction mixture was cooled to room temperature, filtered through decolorizing carbon, and acidified with acetic acid. Crystals of dl-tryptophan began to appear almost at once, and crystallization was complete overnight. The tryptophan was collected on a filter, washed with methanol, and dried. There was obtained 160 pounds, or 0.785 mol of dl-tryptophan, representing a yield of 78.5 percent.

An aliquot sample of the reaction mixture, withdrawn after the initial step of the reaction and before addition of the second batch of alkali, was found to yield a product consisting almost entirely of N-acetyl dl-tryptophan, upon acidification with hydrochloric acid. The amount of such crystals represents a yield of 85 to 90 percent.

The invention has been illustrated with reference to the treatment of diethyl acetamido-(3-indolylmethyl) malonate with sodium hydroxide solutions. It is applicable as well to the treatment of other dialkyl esters of the same or other acylamido malonic acid compounds with the same or other alkalies, to yield successively the N-acyl dl-amino acids and the dl-amino acids themselves. The alkaline deacylation reaction of the second stage in the preparation of dl-tryptophan has been illustrated as being carried out under pressure at a temperature near 175° C. This reaction may also be effected at the reflux temperature of the alkaline reaction mixture, but requires a prolonged time for completion at temperatures near 100° C., while it may be completed in two hours or less at temperatures from 150° to 250° C., the required time at any operative temperature being shorter with large excesses of alkali than when the excess of alkali is small.

EXAMPLE 2

The following Table I illustrates the effect of variation in the ratio of sodium hydroxide to diethyl acetamido-(3-indolylmethyl)malonate in the preparation of N-acetyl dl-tryptophan. The same amount of water was used in each run as the reaction medium. All reported runs were made in a steel pressure vessel at 170° to 175° C. After 1.5 hours at that temperature, the bomb was cooled, and 2 mols of additional sodium hydroxide, per original mol of ester, was introduced. The resulting mixture was heated again to 170° to 175° C. for 2 hours. The mixture was cooled, acidified, and the tryptophan was recovered.

*Table 1*

| Mols NaOH per mol ester | pH at end of first step | Percent yield of dl-tryptophan | Melting point of dl-tryptophan, °C. |
| --- | --- | --- | --- |
| 3.0 | 10.6 | 28.4 | 243–248 |
| 2.75 | 10.6 | 28.4 | 253–255 |
| 2.5 | 10.6 | 81 | 255–260 |
| 2.25 | 9.6 | 81 | 260–265 |
| 2.0 | | 81 | 265–267 |
| 1.8 | | 81 | 263–265 |
| 1.6 | 7.6 | 83 | 263–265 |
| 1.5 | | 81 | 258–260 |
| 1.4 | | 76 | 258–260 |
| 1.3 | | 71 | 255–257 |

It is noted that, with over 2.5 mols of sodium hydroxide for each mol of initial ester, the ultimate yield of tryptophan is low and the quality of the product is poor. The yield is practical when 1.3 to 2.5 mols of sodium hydroxide are used per mol of ester. The yield and quality of the tryptophan reach optimum values when 1.5 to 2.25 mols of alkali metal hydroxide are used in the saponification and decarboxylation step, for each mol of ester being treated.

EXAMPLE 3

In another series of runs, reported in Table II, the product of a single step saponification and decarboxylation was analyzed. The principal variable in these runs was temperature. In a few of the runs, when the higher temperatures were being employed, the reaction mixture was heated to the designated temperature and the vessel was then cooled as rapidly as possible. In such runs, the time at reaction temperature is indicated in the table as being one minute, mainly to distinguish such runs from those in which the reaction was continued over an hour. The product from each run was acidified and crystallized.

Table II

| Mols NaOH per mol ester | Temp., °C. | Time at Temp. | pH at end of run | Yield acetyl tryptophan percent | M. P., °C. | Yield tryptophan, percent |
|---|---|---|---|---|---|---|
| 2.5 | 170-175 | 1.5 hrs | 9.8 | 83.5 | 206-207 | |
| 2.0 | 170-175 | 1.5 hrs | 9.0 | 83.5 | 206-207 | |
| 1.8 | 170-175 | 1.5 hrs | 9.4 | 83.5 | 206-207 | |
| 2.0 | 200 | 1.5 hrs | 8.2 | 82 | 204-205 | |
| 2.0 | 225 | 1.5 hrs | 8.2 | 45.8 | 204-205 | 48.0 |
| 2.0 | 250 | 1.5 hrs | 8.2 | none | | 78.5 |
| 2.0 | 250 | 1 min | 8.2 | 70.8 | 202-204 | 19.6 |
| 2.0 | 300 | 1 min | 7.8 | none | | 63.7 |
| 2.5 | 300 | 1 min | 9.8 | none | | 85 |

Thus, at temperatures above 200° C., there is a time within which the original ester is not only saponified and decarboxylated but also deacetylated to produce tryptophan in a single step. When temperatures from 250° to 300° C. are used, complete deacetylation can be effected and practical yields of tryptophan are attainable in the one step. No apparent decomposition of the product is noted in runs in which temperatures as high as 300° C. are reached.

EXAMPLE 4

The diethyl ester of acetamido benzyl malonic acid was prepared by first making a solution of one mol of sodium ethoxide in a liter of ethanol, adding one mol (216 grams) of diethyl acetamido malonate and 1 mol (126.5 grams) of benzyl chloride. The resulting reaction mixture was held at the reflux temperature of the alcoholic medium for 3 hours and was then filtered to remove sodium chloride. The filtrate was freed from ethanol by evaporation to dryness. The residue was slurried in water and 265 grams (86.2 percent yield) of diethyl acetamido benzylmalonate, melting at 102°–104° C. was recovered.

A mixture of 30.7 grams (0.1 mol) of diethyl acetamido benzylmalonate, 200 cc. of water and 8 grams (0.2 mol) of sodium hydroxide was heated at 175° C. for 1.5 hours in a stainless steel pressure vessel. The reaction mixture was stirred with decolorizing carbon, acidified to pH 2 with hydrochloric acid, filtered and concentrated to half volume by evaporation of water. When the concentrate was cooled, there was obtained 19 grams (91.8 percent yield) of acetyl-dl-phenylalanine.

EXAMPLE 5

A mixture of 30.7 grams (0.1 mol) of diethyl acetamido benzylmalonate, whose preparation is described in the first paragraph of Example 4, 200 cc. of water and 8 grams (0.2 mol) of sodium hydroxide was heated for 1.5 hours at 175° C., as in Example 4. An additional 8 grams of sodium hydroxide was introduced into the reaction vessel and heating was continued for 2 more hours at 175° C. The reaction mixture was decolorized with charcoal, filtered, neutralized with acetic acid and cooled. There was recovered 15.0 grams (90.7 percent yield) of dl-phenylalanine.

EXAMPLE 6

There was heated together at 175° C. for 1.5 hours a mixture consisting initially of 21.7 grams (0.1 mol) of diethyl acetamidomalonate, 8 grams (0.2 mol) of sodium hydroxide and 200 cc. of water. The reaction mixture was treated with carbon, filtered, and mixed with granules of a hydrogen form of a cation exchange resin in amount sufficient to bring the pH of the mixture to a value below 2. The liquor was separated from the resin by filtration and the filtrate was evaporated to a volume of about 30 cc. When cooled, 10.5 grams (89.7 percent yield) of acetylglycine crystallized from the solution.

EXAMPLE 7

The first step of the process of Example 6 was repeated, and 8 grams of additional sodium hydroxide was introduced into the mixture. Heating was continued for 2 hours at 175° C. The reaction mixture was treated with enough of the acid form of a cation exchange resin to lower the pH of the solution to 7, and then was filtered. The filtrate was decolorized with carbon, filtered again, and concentrated nearly to dryness under subatmospheric pressure. Enough water was added to dissolve the solids and methanol was added to this solution to precipitate glycine. There was obtained 7.0 grams (93 percent yield) of glycine melting in the range 220°–225° C. When redissolved in 15 cc. of water and precipitated with 50 cc. of methanol, the glycine melted at 227°–230° C. and weighed 6.5 grams, representing a yield of 86.7 percent of theoretical.

The invention has been illustrated using sodium hydroxide as the alkaline agent. Other alkali metal hydroxides and the alkaline earth metal hydroxides may be used instead. Examples of such agents are the hydroxides of potassium, lithium, calcium and barium.

This application is a continuation-in-part of our copending application Serial No. 245,771, filed September 8, 1951, now abandoned.

We claim:

1. A method which comprises saponifying and decarboxylating a dialkyl ester of an acylamido malonic acid compound having the general formula

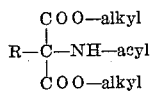

solely by means of heat and alkali, the saponification and decarboxylation step consisting in mixing and heating the said ester with from 1.3 to 2.5 equivalent weights of an alkali for each mol of said ester, in an aqueous medium, under superatmospheric pressure, at a temperature between 150° and 300° C.; the symbol R in said formula being selected from the group consisting of hydrogen and, alkyl groups containing from 1 to 18 carbon atoms, hydroxyalkyl, mercaptoalkyl, alkoxyalkyl, alkyl-mercaptoalkyl, benzyl, phenethyl, phenyl, tolyl, xylyl, ethyl phenyl, isopropyl phenyl, naphthyl, thienyl, pyridyl, methyl pyridyl, furyl, pyranyl, indolyl methyl, pyridyl ethyl and thienyl methyl.

2. A method as claimed in claim 1, wherein there is used from 1.5 to 2.25 equivalent weights of alkali for each mol of ester in the saponification and decarboxylation step.

3. A method as claimed in claim 1, wherein the ester subjected to saponification and decarboxylation is a dialkyl ester of acetamido-(3-indolylmethyl)malonic acid.

4. A method as claimed in claim 1, wherein the ester subjected to saponification and decarboxylation is a dialkyl ester of acetamido benzylmalonate.

5. A method as claimed in claim 1, wherein the ester subjected to saponification and decarboxylation is a dialkyl ester of acetamido malonate.

6. A method which consists in mixing a dialkyl ester as defined in claim 1 with an aqueous solution of from 1.5 to 2.25 mols of sodium hydroxide for each mol of the ester, heating the mixture under superatmospheric pressure at a temperature from 150° to 250° C. until saponification and decarboxylation are essentially complete, cooling the reaction mixture before substantial deacylation has occurred, acidifying the cooled solution, and recovering the N-acyl dl-α-amino acid therefrom.

7. The method claimed in claim 6, wherein the ester subjected to treatment is a dialkyl ester of acetamido-(3-indolylmethyl)malonic acid.

8. A method which consists essentially in mixing a dialkyl ester as defined in claim 1 with an aqueous solution of from 1.5 to 2.25 mols of sodium hydroxide for each mol of the ester, heating the mixture under superatmospheric pressure at a temperature from 150° to 250° C. until saponification and decarboxylation are essentially complete, and thereafter, without isolation of the intermediate product, heating the said mixture with an additional and excess amount of sodium hydroxide at a temperature at least as high as the atmospheric pressure boiling point of the mixture, to deacylate the intermediate product, cooling the reaction mixture, and recovering dl-α-amino acid therefrom after acidification.

9. The method claimed in claim 8, wherein the ester subjected to the treatment is a dialkyl ester of acetamido-(3-indolylmethyl)malonic acid.

10. A method for the preparation of dl-α-amino acids which consists essentially in mixing a dialkyl ester as defined in claim 1 with an aqueous solution of at least 2 mols of alkali metal hydroxide per mol of the ester, heating the mixture under superatmospheric pressure to at least 225° C. for a time sufficient to effect saponification, decarboxylation and deacylation, cooling and acidifying the reaction mixture, and recovering the amino acid therefrom.

11. The method claimed in claim 10, wherein the ester subjected to the treatment is a dialkyl ester of acetamido-(3-indolylmethyl)malonic acid.

12. The method claimed in claim 11, wherein a reaction temperature of about 300° C. is maintained for at least one minute.

References Cited in the file of this patent
UNITED STATES PATENTS 2,621,187   Jones et al. _____ Dec. 9, 1952

OTHER REFERENCES

Snyder et al.: Jr. Am. Chem. Soc., vol. 66, pp. 350–351 (1944).

Albertson et al.: Jr. Am. Chem. Soc., vol. 66, p. 500 (1944).

Albertson et al.: Jr. Am. Chem. Soc., vol. 67, p. 502 (1945).

Jackman et al.: Jr. Am. Chem. Soc., vol. 68, pp. 2105–2106 (1946).

Albertson et al.: Jr. Am. Chem. Soc., vol. 70, pp. 1150–1153 (1948).

J. A. C. S., vol. 66, pages 200–203 (1944).

Jour. Am. Chem. Soc., vol. 68, pages 450–453 (1946).